June 20, 1967  F. SCHLOSS  3,326,038

TESTING APPARATUS

Filed June 11, 1964

INVENTOR.
FRED SCHLOSS
BY
ATTYS.

United States Patent Office 3,326,038
Patented June 20, 1967

3,326,038
TESTING APPARATUS
Fred Schloss, Arlington, Va., assignor to the United States of America as represented by the Secretary of the Navy
Filed June 11, 1964, Ser. No. 374,552
14 Claims. (Cl. 73—71.6)

The invention described herein may be manufactured and used by or for the Government of the United States of America for governmental purposes without the payment of any royalties thereon or therefor.

The present invention relates to vibration systems and more particularly to the elimination of transverse or rocking motion in vibration systems utilized for calibrating accelerometers or the like.

One of the most difficult problems in the calibration of accelerometers and other transducers at high frequencies originates in the motion of the vibration table to which the accelerometer is mounted; namely its transverse or rocking motion. Any transverse or rocking motion of the vibration table will cause errors in the calibration, especially if a high degree of accuracy is required. These errors may be observed by phase measurement between a very high frequency standard and the accelerometer to be calibrated on a comparator.

The present invention eliminates the trouble due to transverse or rocking motion of the vibration table by mechanical isolation of the undesired motions while simultaneously retaining good transmission of the axial motion. This is accomplished by utilizing a material having a Poisson's ratio of approximately ½, a shear modulus containing a zero reactive part, a very nearly zero complex shear modulus and a very high axial modulus for isolating the accelerometer from the vibrating table.

An object of the invention is to provide a vibrating table containing isolation means for eliminating transverse or rocking motion.

A further object of the invention is to provide a vibration table for accurately calibrating accelerometers at high frequencies.

Still another object of the invention is to provide a force gage having a very low transverse or rocking sensitivity.

A further object of the invention is to provide an accelerometer having a very low transverse or rocking sensitivity.

Other objects and many of the attendant advantages of this invention will be readily appreciated as the same becomes better understood by reference to the following detailed description when considered in connection with the accompanying drawings wherein.

Figure 1:
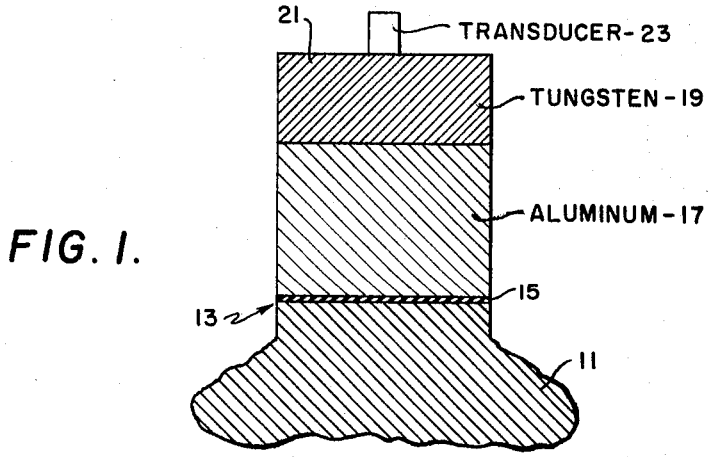
FIG. 1 is a cross-section of a fragmentary view showing a vibrating table in accordance with the invention.

Referring to FIG. 1 a vibrating driver 11 is provided with an upper surface 13 for example having a diameter of one and a half inches. A sheet 15 is placed with one face in contact with surface 13 of the driver.

The sheet may be made out of any rubber which has a Poisson's ratio of approximately ½ such as natural rubber, known as hevea. The rubber sheet for example may be approximately 1/64 of an inch thick and 1½ in diameter. Other materials having a Poisson's ratio of ½ such as fluids, for example water, mercury etc., may be used in the form of a very thin film provided suitable containing means is utilized for containing the fluids. An aluminum member 17 has one end connected in contact with the free face of the sheet 15 and functions as a lever arm whose function will be hereafter discussed in greater detail. An inertial member 19 made of tungsten has one end connected to the free end of the aluminum member 17. A transducer 23 such as an accelerometer to be calibrated is mounted on the face 21 of the tungsten member.

The operation of FIG. 1 is as follows, the driver 11 vibrates up and down driving the aluminum member 17, the tungsten member 19 and the transducer 23. The transverse motion is eliminated due to the nearly zero complex shear modulus and zero reactive part shear modulus of the rubber sheet. In addition an inertial mass tungsten member 19 mounted on a relatively high cylinder of a relatively light aluminum material provides a low transverse resonant frequency thereby reducing the transmission of transverse motion, resulting from any rocking about a diameter of the rubber sheet 15. The aluminum member 17 functions as a coupling member for motion along the vertical axis while acting as a lever for the inertial mass reducing the transmission of motion transverse to the vertical axis.

Figure 2:
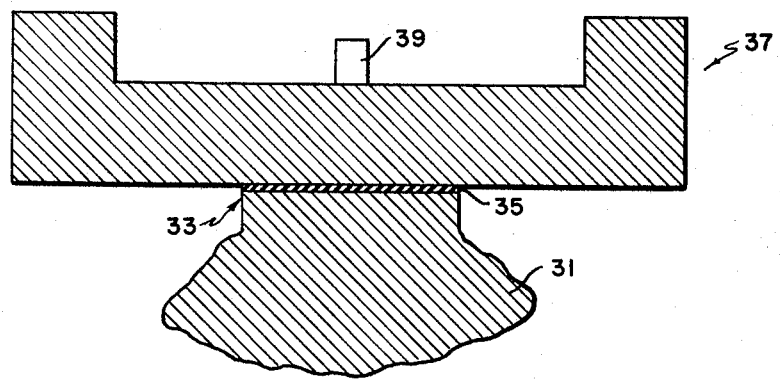
FIG. 2 is a cross-section of a fragmentary view showing an alternate embodiment of a vibrating table in accordance with the invention.

Referring to FIG. 2 a vibrating driver 31 has an upper surface 33. A rubber sheet 35 is mounted on the upper surface 33 of the vibrating driver 31. An inertial mass 37 is mounted on the free surface of the rubber sheet 35. An accelerometer 39 to be calibrated is mounted on top of the inertial mass 37.

The operation of FIG. 2 is as follows, the driver 31 vibrates up and down driving the inertial mass 37 and accelerometer 39. The transverse motion is elimininated due to the nearly zero complex shear modulus and zero reactive part shear modulus of the rubber sheet 35.

Figure 3:
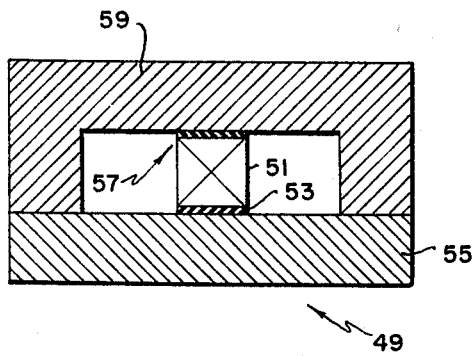
FIG. 3 is a cross-section of a force generator having a very low transverse sensitivity in accordance with the invention.

Referring to FIG. 3 a unidirectional force gage 49 is constructed by mounting a force gage 51 on a thin rubber sheet 53. The rubber sheet is mounted on a metal base member 55. A second rubber sheet 57 is mounted on top of the force gage 51. A metal housing is mounted on top of the second rubber sheet 57 and fastened to the metal base 55 thereby holding the force gage 51 in place. The force gage 51 may be a piezoelectric crystal force gage.

The operation of FIG. 3 is as follows, forces acting along the vertical axis are transmitted to the force gage 51. However, force acting in a transverse direction to the vertical axis are eliminated due to the nearly zero complex shear modulus and zero reactive part shear modulus of the rubber sheets 53 and 57.

Obviously many modifications and variations of the present invention are possible in the light of the above teachings. It is therefore to be understood that within the scope of the appended claims the invention may be practiced otherwise than as specifically described.

What is claimed is:

1. Apparatus for vibrating a transducer which is to be accurately calibrated comprising:
   a transducer to be calibrated;
   a vibrating driving means for vibrating said transducer; and
   means having an approximately zero complex shear modulus and approximately zero reactive part shear modulus coupling said transducer to said vibrating driving means, whereby said transducer is subject to motion in a single direction.

2. Apparatus for driving a transducer comprising:
   a driving means;
   an inertial mass;
   means having approximately zero complex shear modulus and approximately zero reactive part shear modulus coupling said driving means to said inertial mass whereby transverse motion is eliminated; and
   a transducer mounted on said inertial mass.

3. Apparatus for driving a transducer as defined in claim 2 but further characterized by having an aluminum member connected to said inertial mass, said aluminum member connecting said inertial mass to said zero complex shear modulus means.

4. Apparatus for driving a transducer as defined in claim 3, but further characterized by having said inertial mass made out of tungsten.

5. Apparatus for driving a transducer as defined in claim 2, but further characterized by having said inertial mass made of tungsten.

6. Apparatus for vibrating a transducer which is to be accurately calibrated comprising:
   a transducer to be calibrated;
   a vibrating driving means for vibrating said transducer; and
   means having an approximately zero complex shear modulus and approximately zero reactive art shear modulus coupling said transducer to said vibrating driving means, said last named means being a thin resilient rubber sheet, whereby said transducer is subject to motion in a single direction.

7. Apparatus for driving a transducer comprising:
   a driving means;
   an inertial means;
   means having approximately zero complex shear modulus and approximately zero reactive part shear modulus coupling said driving means to said inertial means said last named coupling means being a thin resilient rubber sheet whereby said inertial means is only subject to motion in a single direction; and
   a transducer mounted on said inertial means.

8. Apparatus for driving a transducer as defined in claim 7 but further characterized by having an aluminum member connected to said inertial mass, said aluminum member connecting said inertial mass to said rubber sheet.

9. Apparatus for driving a transducer as defined in claim 8 but further characterized by having said inertial mass made of tungsten.

10. Apparatus for driving a transducer as defined in claim 7 but further characterized by having said inertial means made of tungsten.

11. A transducer comprising:
    a sensing element;
    a housing enclosing said sensing element;
    a first resilient means having approximately zero complex shear modulus and approximately zero reactive shear modulus coupling one side of said sensing element to said housing; and
    a second resilient means having approximately zero complex shear modulus and approximately zero reactive shear modulus coupling the opposite side of said sensing element to said housing whereby said sensing means is only responsive to unidirectional motion.

12. A transducer as defined in claim 11 but further characterized by said sensing element comprising a piezoelectric crystal.

13. A transducer as defined in claim 12 but further characterized by said first and second means having approximately zero complex shear modulus and approximately zero reactive shear modulus comprising a rubber sheet.

14. A transducer as defined in claim 11, but further characterized by said first and second means having approximately zero complex shear modulus and approximately zero reactive shear modulus comprising a rubber sheet.

References Cited

UNITED STATES PATENTS

| | | | |
|---|---|---|---|
| 2,239,550 | 4/1941 | Cubert | 310—8.4 X |
| 2,339,173 | 1/1944 | Koren | 310—8.4 X |
| 2,439,219 | 4/1948 | O'Connor | 310—29 |
| 2,868,570 | 1/1959 | Hines et al. | 177—211 X |
| 3,062,041 | 11/1962 | Spodnewski | 73—71.6 |
| 3,113,288 | 12/1963 | Snavely | 310—9.1 X |

RICHARD C. QUEISSER, *Primary Examiner.*

J. J. GILL, *Assistant Examiner.*